W. H. KEMPER.
TRACTOR.
APPLICATION FILED JAN. 9, 1920.
1,364,767.
Patented Jan. 4, 1921.
4 SHEETS—SHEET 1.
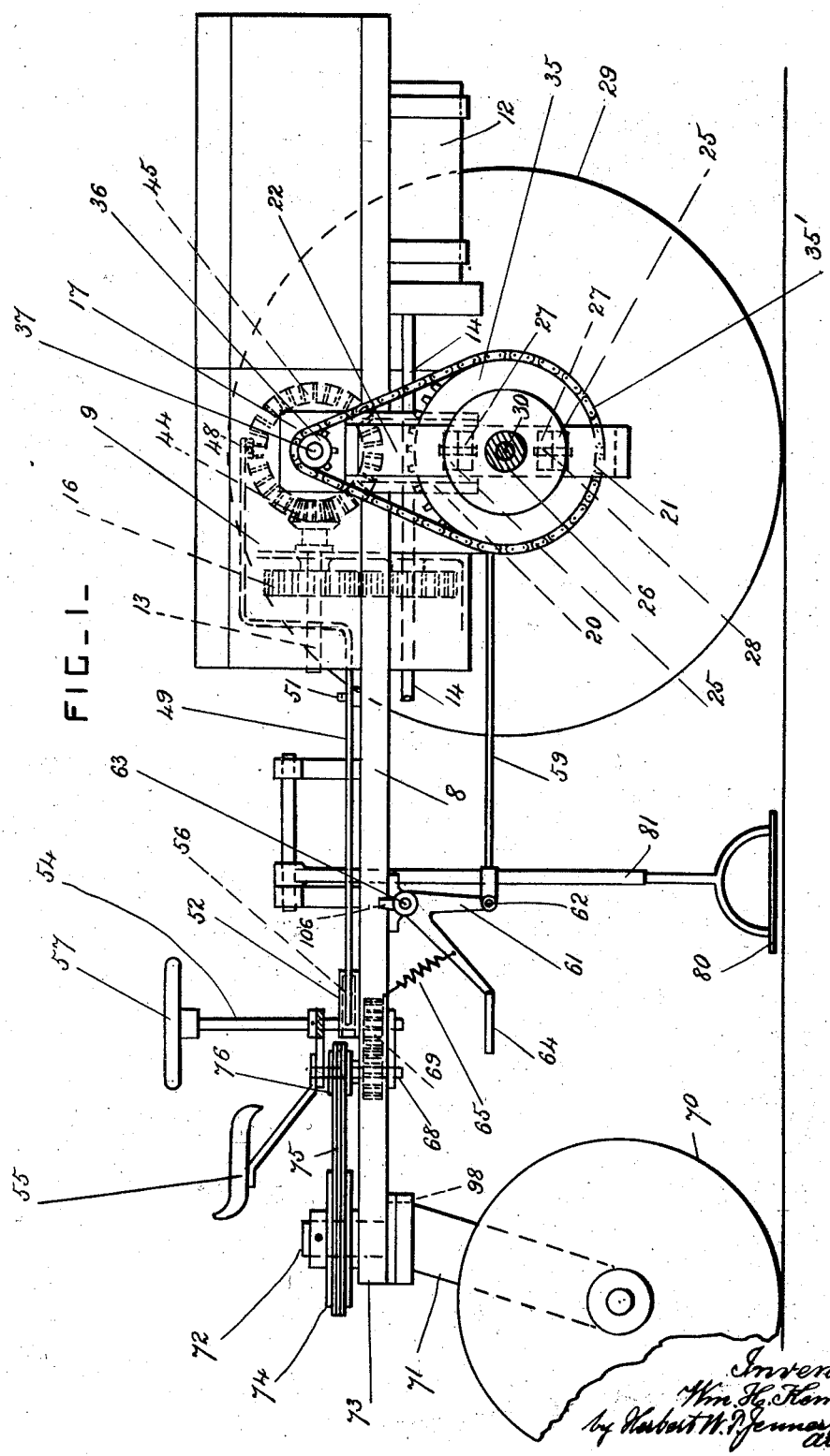

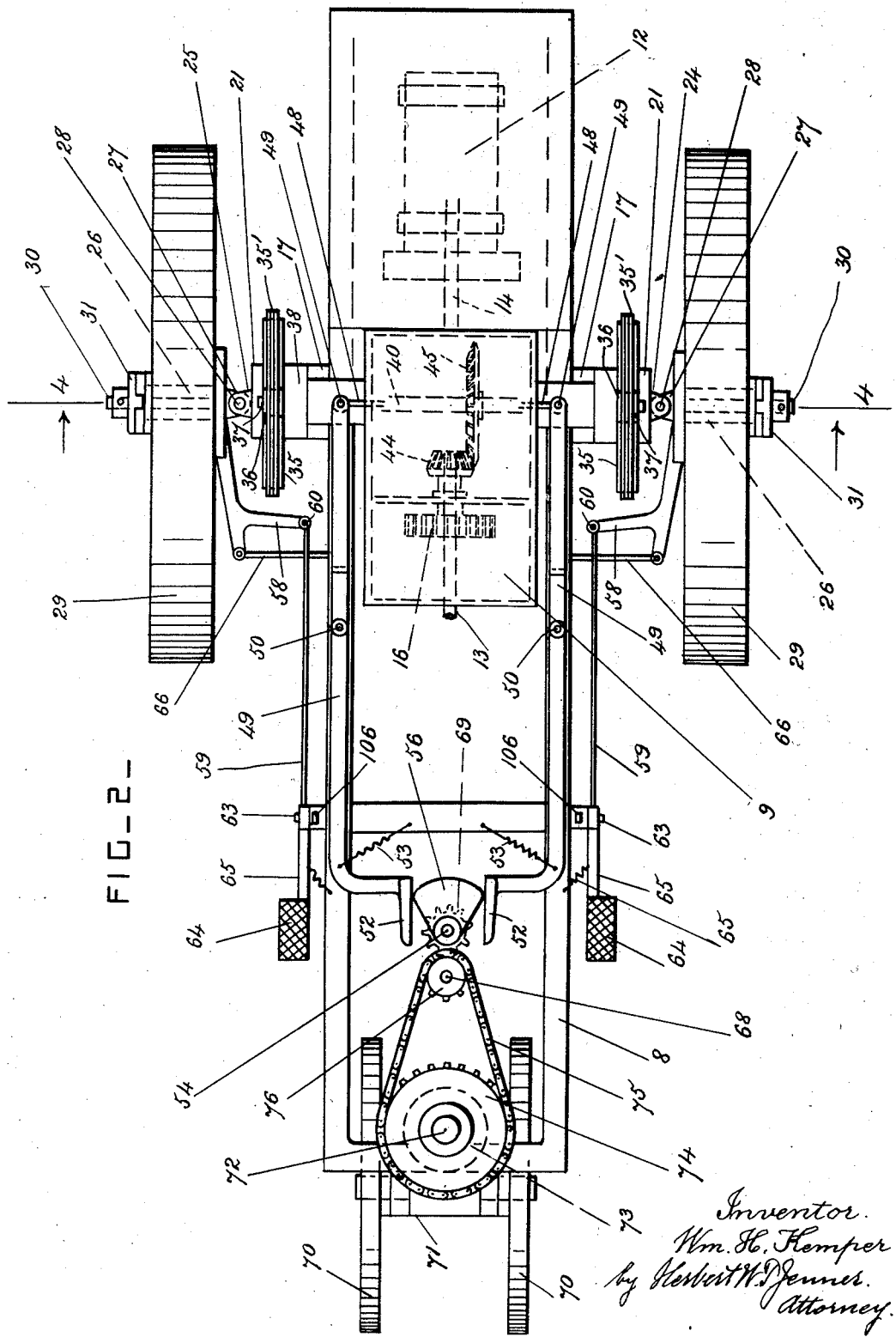

W. H. KEMPER.
TRACTOR.
APPLICATION FILED JAN. 9, 1920.
1,364,767.
Patented Jan. 4, 1921.
4 SHEETS—SHEET 3.
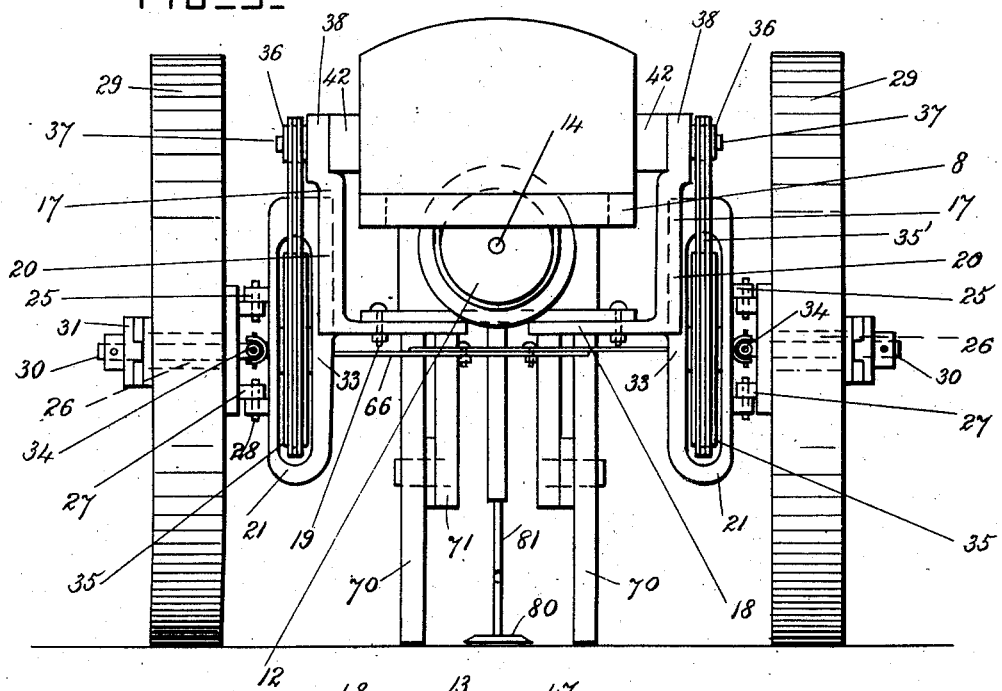
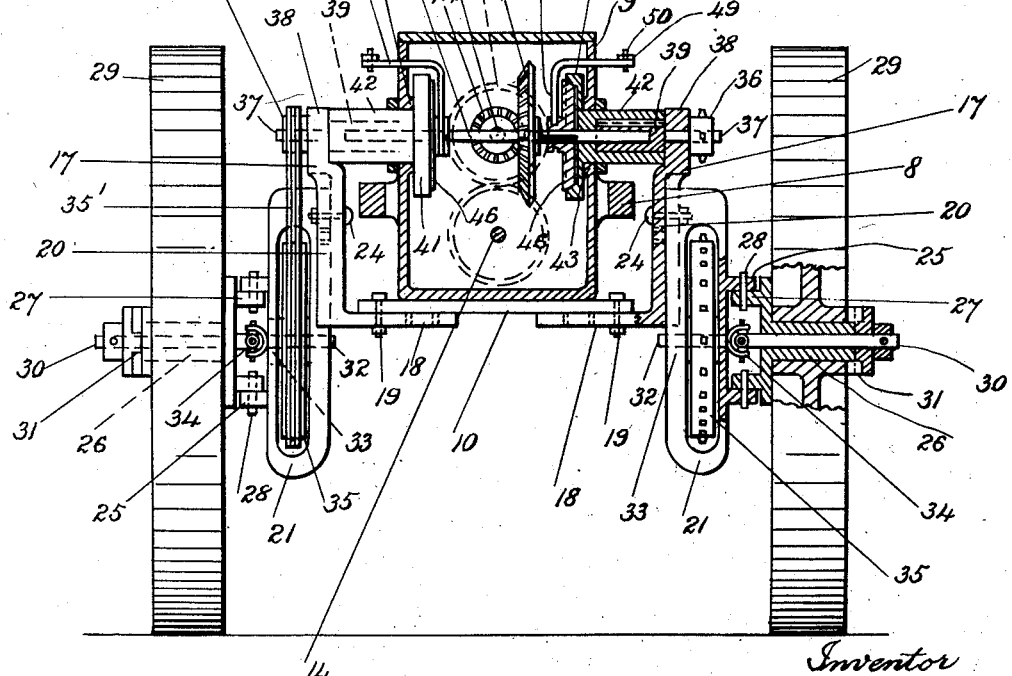

W. H. KEMPER.
TRACTOR.
APPLICATION FILED JAN. 9, 1920.
1,364,767.
Patented Jan. 4, 1921.
4 SHEETS—SHEET 4.
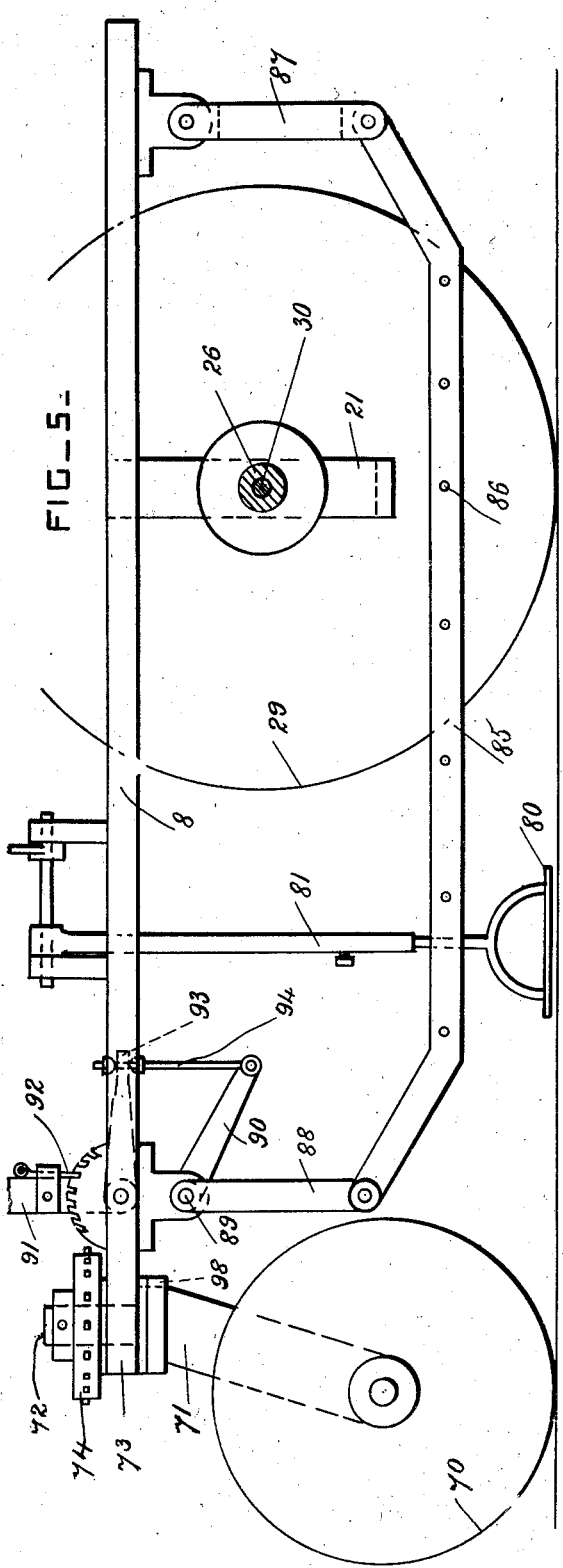
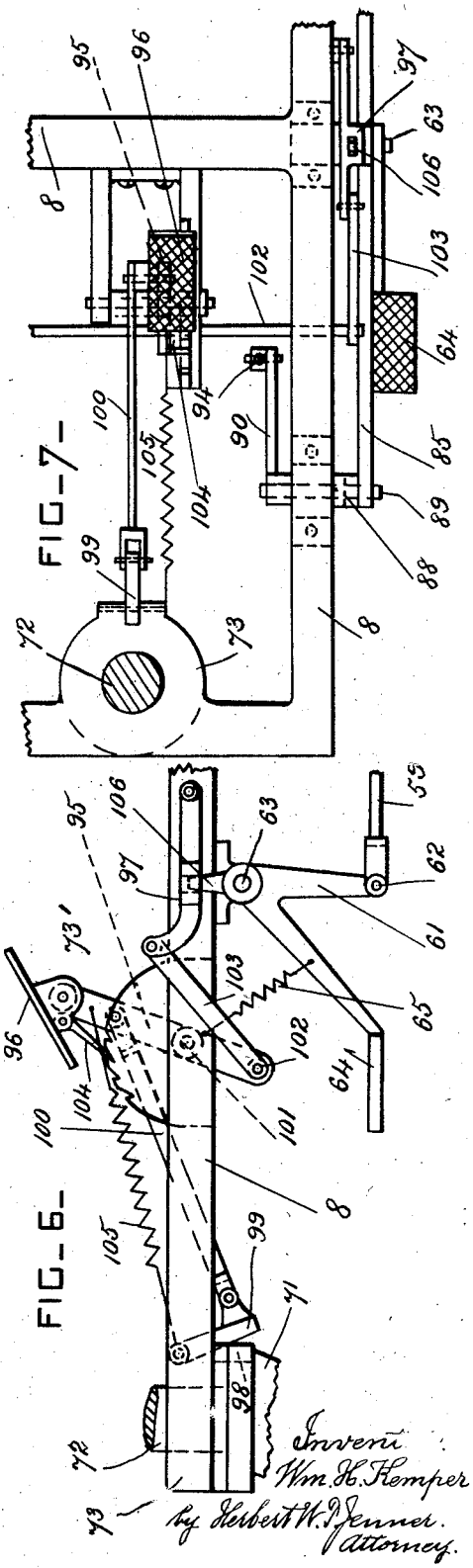
Inventor
Wm. H. Kemper
by Herbert W. Jenner
Attorney

UNITED STATES PATENT OFFICE.

WILLIAM H. KEMPER, OF MONTGOMERY, ALABAMA.

TRACTOR.

1,364,767.    Specification of Letters Patent.    Patented Jan. 4, 1921.

Application filed January 9, 1920. Serial No. 350,413.

*To all whom it may concern:*

Be it known that I, WILLIAM H. KEMPER, a citizen of the United States, residing at Montgomery, in the county of Montgomery and State of Alabama, have invented certain new and useful Improvements in Tractors, of which the following is a specification.

This invention relates to tractors chiefly intended for use in connection with agricultural machines; and it consists in the novel construction and combination of the parts hereinafter fully described and claimed whereby the tractor is steered and driven, and adapted for use in connection with different agricultural machines.

In the drawings, Figure 1 is a side view, partially in section, of a tractor constructed according to this invention, with the draft bar attachments and some other parts omitted, for clearness. Fig. 2 is a plan view of the tractor. Fig. 3 is a front end view of the tractor. Fig. 4 is a cross-section, taken on the line 4—4 in Fig. 2. Fig. 5 is a side view of portions of the tractor showing one of the draft bars and the means for operating it, and also showing portions of a cotton chopping device. Fig. 6 is a detail side view of the locking device 73′, drawn to a larger scale. Fig. 7 is a plan view of the same, showing also a portion of one of the draft bars 85.

The tractor is provided with a frame 8 having a housing 9 secured to it, and provided with a crossbar 10 on its bottom. The motor 12 is secured to the front end portion of the frame and is of any approved construction, and its main driving shaft or crankshaft 14 is arranged longitudinally of the machine, and is operatively connected with a countershaft 13, arranged above it, by suitable transmission gearing indicated generally by the numeral 16.

Uprights 17 are provided at each side of the frame, and have tongues 18 which project under the crossbar 10 and are adjustably connected to it by bolts 19 which engage with any of a series of holes so that the uprights 17 can be set at different distances apart to vary the width of the machine. The uprights 17 have vertical guides 20, and 21 are loop-shaped brackets having slides 22 which are slidable in the guides 20 and which are secured by bolts 24 which engage with any of a series of holes so that the position of the brackets can be adjusted vertically.

The brackets 21 have lugs 25 which project laterally, and 26 are tubular stub axles having lugs 27 which are pivoted to the lugs 25 by vertical pins 28 so that the stub axles may rock horizontally to a limited extent. The main driving and steering ground wheels 29 are journaled on the stub axles 26, and are driven by shafts 30, journaled in the tubular stub axles, and connected to the wheel hubs by toothed clutches 31. Shafts 32 are journaled in bearings 33 in the brackets 21, and are connected to the shafts 30 by universal joints 34.

Sprocket wheels 35 are secured on the shafts 32, and are arranged in the loops of the brackets 21, and are revolved by suitable drive chains 35′ from sprocket wheels 36 secured on shafts 37 journaled in bearings 38 on the uprights 17. The brackets are adjusted so as to keep the drive chains taut. Tubular sleeves 39 are secured on the shafts 37 and form bearings for the end portions of a cross-shaft 40 which extends across the housing 9.

Friction clutch members 41 are arranged inside the housing, and have tubular sleeves 42 which are splined upon the sleeves 39 and journaled in bearings 43 on the housing. This telescopic arrangement of the sleeves 42 and 39 permits the uprights 17 to be adjusted to vary the distance apart of the ground wheels 29 according to the work to be performed.

A beveled toothed pinion 44 is secured on the countershaft 13, and gears into a beveled toothed wheel 45 secured on the cross-shaft 40. Friction clutch members 46 are splined on the cross-shaft 40 and are slidable into and out of engagement with the friction clutch members 41. Forked arms 47 are provided for sliding the clutch members 46, and they have stems 48 which slide in holes in the sides of the housing, and have their end portions pivoted to levers 49 by pins 50. The levers 49 are pivoted at their middle parts to the frame by pins 51, and have shoes 52 on their rear end portions which project inwardly. Springs 53 are secured to the levers 49 and to the frame, and normally hold both friction clutches in engagement so that both ground wheels 29 are revolved simultaneously by the motor.

The steering shaft 54 is arranged vertically at the rear part of the machine and is journaled in the frame in front of the seat 55 for the operator. This steering shaft has a cam 56 secured on it, and arranged between the shoes 52. The two friction clutch members 46 are moved out of action alternately by oscillating the steering shaft by means of its hand wheel 57, so that only one or the other of the ground wheels 29 is revolved by the motor when it is desired to make a sharp turn at the end of a field.

Under ordinary circumstances the steering is effected by moving the stub axles pivotally. The stub axles have inwardly projecting arms 58, and 59 are rods pivoted at their front ends to the arms 58 by pins 60. The rear ends of the rods 59 are pivoted to levers 61 by pins 62, and the levers 61 are pivoted to the frame by pins 63. Pedals 64 are connected to the levers 61, and are normally held in their raised positions by springs 65. The operator sits with his feet on the pedals 64 and operates the stub axles pivotally, a coupling-rod 66 being pivoted to arms 58 on the stub axles so that they move simultaneously.

A vertical shaft 68 is journaled in the frame to the rear of the steering shaft 54, and is connected with the steering shaft by intergearing toothed wheels 69, so that the two shafts revolve in opposite directions. Rear ground wheels 70 are journaled in a standard 71 provided with a vertical pivot shaft 72 which is mounted to oscillate in a bearing 73 on the frame. This pivot shaft has a sprocket wheel 74 secured on it, and connected by a drive chain 75 with a sprocket wheel 76 secured on the intermediate shaft 68. When one of the front ground wheels 29 is disconnected from the motor, the rear ground wheels 70 are moved simultaneously in the appropriate direction by the pivot shaft 72 to effect the quick turning of the machine.

A slidable locking device 73' is provided and is actuated by the foot of the operator. When pushed forwardly it locks the pedals 64, and when pushed rearwardly it locks the steering shaft 54 so that the rear ground wheels are not moved pivotally.

The tractor can be used to operate a cotton chopper having a blade 80 carried by an arm 81 which is pivoted to the frame and which works crosswise of it, and which is oscillated from the motor by any approved driving mechanism. The motor is provided with a clutch on its crankshaft and other suitable accessories commonly used on tractors and which are not shown.

When the tractor is used in connection with plows and cultivating implements of various forms, the width apart of the front ground wheels is adjusted to suit the implements, and the implements are connected to drawbars 85 arranged one on each side of the frame and parallel to each other. Each drawbar has a series of holes 86 for the attachment of the implements, and the front end portion of it is pivoted to the frame by a link 87. The rear part of the drawbar is pivoted to the frame by a link 88 and a shaft 89, and an arm 90 is secured on the shaft and moves pivotally with the link 88. A bell-crank hand lever 91 is pivoted to the frame and provided with a suitable catch 92 and notched quadrant. The lateral arm 93 of the bell-crank lever is connected pivotally with the arm 90 by a rod 94, and the height of the drawbar above the ground is adjusted by the hand lever. Each drawbar is adjusted separately, but they may be adjusted simultaneously, and an additional lever may be provided to effect their simultaneous adjustment in any approved way.

The locking device indicated generally by the numeral 73', and shown in detail in Figs. 6 and 7, may be variously modified in carrying out this invention. In the example shown the device is provided with a pivoted foot lever 95 having a foot-plate 96 pivoted to its upper part. The pedals 64 have upwardly projecting lugs 106 adjacent to their pivots, and 97 are catches pivoted to the frame and provided with slots for engaging with the lugs 106. The standard 71 of the rear ground wheels is provided with a notch 98 at its upper part, and 99 is a catch pivoted to the frame and engaging with the notch 98. The catch 99 is connected to the foot lever 95 by a connecting-rod 100, arranged on one side of the pivot 101 of the said foot lever. A rod 102 projects in each direction from the foot lever on the other side of its pivot, and the end portions of this rod are connected to the two catches 97 by connecting-rods 103.

The front and rear catches are released alternately by the movements of the foot lever. The foot lever has a retaining pawl and notched plate 104, and it has a spring 105 for moving it in one direction. The pawl is operated by moving the foot plate pivotally on the end of the foot lever.

What I claim is:

1. In a tractor, a frame, a driving shaft journaled in the frame and provided with means for revolving it, a tubular stub axle pivoted to the frame on a vertical axis and provided with an inwardly projecting arm, a ground wheel journaled on the tubular stub axle, a driving shaft journaled in the tubular stub axle and connected with the said ground wheel, a universal joint between the two said driving shafts, a steering foot lever pivoted to the frame, a connecting device between the said arm and foot lever, a spring for raising the foot lever, and a disengageable locking device for holding the foot lever stationary at will.

2. In a tractor, a frame, a motor, tubular stub axles pivotally connected with the frame by vertical pins and normally arranged in line with each other, ground wheels journaled on the tubular stub axles, driving shafts journaled in the tubular stub axles and connected with the said ground wheels, intermediate driving devices operatively connecting the said driving shafts with the motor, two steering foot levers pivoted to the frame and operatively connected with the respective tubular stub axles, a coupling device between the tubular stub axles, and means for locking the two steering foot levers to the frame when the tubular stub axles are axially in line with each other.

3. In a tractor, a frame, uprights secured to the frame and adjustable to different distances apart, pivoted stub axles connected with the uprights, ground wheels journaled on the stub axles, two driving shafts journaled in the uprights and operatively connected with the ground wheels, a cross-shaft arranged axially in line with and between the two said driving shafts, a motor for revolving the cross-shaft, and telescopic sleeves provided with disengageable clutch mechanisms and connecting the cross-shaft with the two said driving shafts and permitting them to be driven separately or simultaneously.

4. In a tractor, a frame, vertically adjustable brackets secured to the side portions of the frame, a driving means journaled in the upper parts of the said brackets, tubular stub axles pivoted by vertical pins to the said brackets, ground wheels journaled on the tubular stub axles, driving shafts journaled in the tubular stub axles and operatively connected with the ground wheels, and intermediate driving devices arranged between the said driving shafts and the aforesaid driving means and provided with flexible couplings which permit the tubular stub axles to be moved pivotally to steer the machine.

5. In a tractor, a frame provided with uprights having vertical guides, adjustable loop-shaped brackets engaging with the said guides, a driving means provided with sprocket wheels and journaled in the upper parts of the uprights, driving shafts journaled in the said brackets, sprocket wheels secured on the said driving shafts and arranged in the loops of the brackets, driving chains passing over the said sprocket wheels at each side of the machine, stub shafts pivoted by vertical pins to the loop-shaped brackets, ground wheels journaled on the stub shafts, driving shafts journaled in the stub shafts and connected with the ground wheels, universal joints connecting the driving shafts in the stub shafts with those in the said brackets, and means for moving the stub axles pivotally to steer the machine.

6. In a tractor, a frame, uprights secured to the frame and adjustable to different distances apart, pivoted stub axles operatively connected with the uprights, ground wheels journaled on the stub shafts, driving shafts journaled in the upper parts of the said uprights, driving mechanisms operatively connecting the driving shafts with the ground wheels, a cross-shaft arranged axially in line with and between the said driving shafts and provided with means for revolving it, and slidable telescopic sleeves splined together and connecting the said cross-shaft with the said shafts at each end of it.

In testimony whereof I have affixed my signature.

WILLIAM H. KEMPER.